United States Patent [19]

Calderara et al.

[11] Patent Number: 4,802,371
[45] Date of Patent: Feb. 7, 1989

[54] MULTI-COMPONENT DYNAMOMETERS

[75] Inventors: Reto Calderara; Hans-Conrad Sonderegger, both of Neftenbach; Peter Wolfer, Kleinandelfingen, all of Switzerland

[73] Assignee: Kristal Instrumente AG, Switzerland

[21] Appl. No.: 118,048

[22] Filed: Nov. 9, 1987

[51] Int. Cl.[4] .......................... G01L 1/16; G01L 5/16
[52] U.S. Cl. .................. 73/862.04; 73/862.68; 73/DIG. 4; 310/338
[58] Field of Search ......... 73/DIG. 4, 862.04, 862.05, 73/862.06, 862.68; 310/338

[56] References Cited

U.S. PATENT DOCUMENTS

| | | |
|---|---|---|
| 2,880,333 | 3/1959 | Dranetz . |
| 2,988,728 | 6/1961 | Marlow . |
| 3,281,613 | 10/1966 | Hafchek . |
| 3,320,580 | 5/1967 | Sykes . |
| 3,349,259 | 10/1967 | Kistler . |
| 3,390,287 | 6/1968 | Sonderegger . |
| 3,545,283 | 12/1970 | McGunigle . |
| 3,566,163 | 2/1971 | Fisher et al. . |
| 3,582,691 | 6/1971 | Sonderegger et al. . |
| 3,584,243 | 6/1971 | Fabian . |
| 3,614,488 | 10/1971 | Sonderegger et al. . |
| 3,640,130 | 2/1972 | Spescha et al. . |
| 3,727,084 | 4/1973 | Epstein . |
| 3,739,202 | 6/1973 | Cady . |
| 4,213,104 | 7/1980 | Cullen et al. . |
| 4,344,010 | 8/1982 | Vig et al. . |
| 4,430,596 | 2/1984 | Shanley . |
| 4,503,351 | 3/1985 | Souderegger et al. . |
| 4,546,658 | 10/1985 | Roche et al. . |

FOREIGN PATENT DOCUMENTS

| | | |
|---|---|---|
| 0957980 | 2/1957 | Fed. Rep. of Germany . |
| 1929479 | 6/1969 | Fed. Rep. of Germany . |
| 1952522 | 10/1969 | Fed. Rep. of Germany . |

Primary Examiner—Charles A. Ruehl
Attorney, Agent, or Firm—Barnes & Thornburg

[57] ABSTRACT

A multi-component dynamometer for measuring forces and torques includes two force introduction plates and pre-oriented transducer elements without housing arranged between them. Each transucer element comprises typically a rectangular plate and two pre-oriented piezoelectric elements fixed thereon, one of these being sensitive to shear in a direction parallel to one edge of the carrier plate and the other being sensitive to pressure in a direction parallel to the normal of the carrier plate. The pre-oriented transducer elements enable the number of piezoelectric elements and electrical connections to be reduced substantially when assembling measuring platforms, as well as the amount of orientation and testing work. The platforms can be made flatter and more rigid, thereby raising the natural frequency. The electronic measuring and evaluation parts can be integrated partially or wholly into the dynamometer.

21 Claims, 7 Drawing Sheets

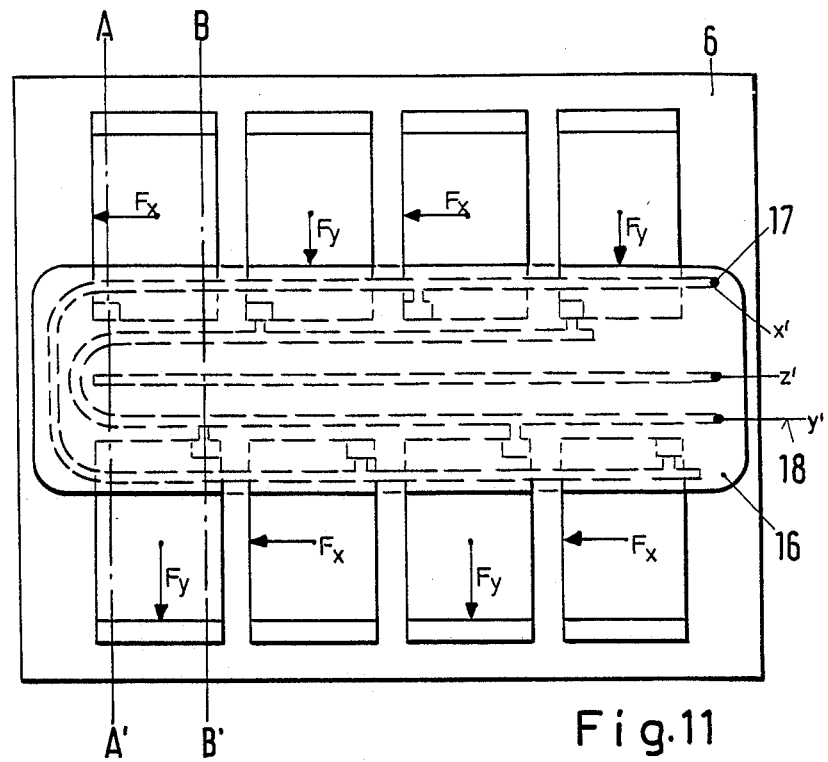
Fig.11
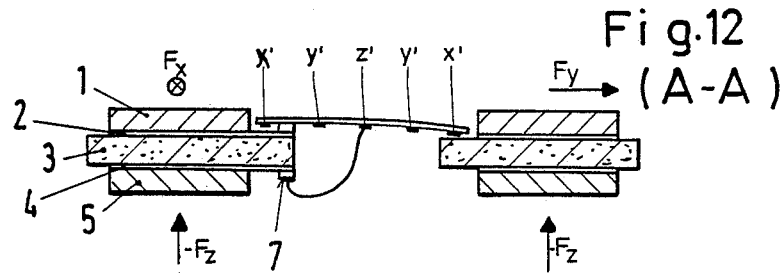
Fig.12 (A-A)
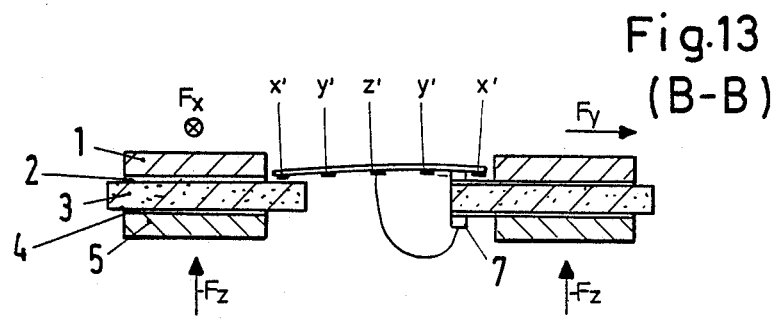
Fig.13 (B-B)

MULTI-COMPONENT DYNAMOMETERS

BACKGROUND AND SUMMARY OF THE INVENTION

The invention relates to multi-component dynamometers for measuring forces and/or torques, especially during metal-cutting operations, consisting of at least one piezoelectric transducer element between a pair of force introduction plates.

Dynamometers for measuring forces and torques are known (e.g. DT-PS No. 9 57 980). They are relatively complicated devices, provided with six force transducers each sensitive selectively in one direction, which measure the forces and the torques resolved into forces The measuring elements used do not measure forces directly but strains This has the detrimental consequence that the two machine components, in themselves rigid, between which forces and torques are to be measured, are joined elastically. As a result the measuring system has a relatively low natural frequency, so that rapid changes of the measured variables as occur especially in metal-cutting operations are no longer detectable. Moreover, the force introduction is complicated with these systems, because the force resolution into the six components dictated by the measuring arrangement is effected typically via elastic knife edges. For these reasons, such devices are of complicated design and cannot be assembled into compact components.

Similarly complicated would be fitting force transducers as described in the aforementioned DT-PS with piezoelectric measuring cells instead of the strain gauging systems capable of registering a force acting in one direction only. The resulting devices are too bulky and complicated. Simpler is the fitting of systems for measuring forces and torques when multi-component measuring platforms are used as described in DT-PS No. 19 52 522. These platforms contain four force-measuring cells in individual housings, each responding to force components, generally more than one. Arrays consisting of 6 piezoelectric crystals may be used as measuring cells, one pair sensitive to pressure and two pairs to shear, generally in directions normal to each other. Such measuring cells are described, for example, in "Piezoelektrische Messtechnik", Springer Verlag, 1980, p. 169.

Though dynamometers designed in this way have adequate rigidity for many applications, higher natural frequencies are desirable especially in metal-cutting operations, in order to detect still faster changes in the force components. Moreover, still flatter dynamometers are desirable, in order to minimize their mechanical elasticity and to require as little space as possible for installation. In addition, mounting these dynamometers should be as simple as possible.

The invention solves the task arising from these desiderata by virtue of the following features according to which the multi-component dynamometer contains transducer elements each having at least two piezoelectric elements joined by an insulating carrier arranged between them. The piezoelectric elements are pre-oriented in relation to the coordinate system given by the carrier, whereby one of the piezoelectric elements of each transducer element is pressure-sensitive in a direction normal to the plane of the force introduction plates while the other piezoelectric element is shear-sensitive in the plane of the force introduction plates.

The shear sensitivity directions of the individual transducer elements may be chosen differently within the plane of the force introduction plates.

Unlike the above-mentioned DT-PS No. 19 52 522, the preferably non-housed transducer element of the dynamometer according to the invention is pre-oriented crystallographically, and in the preferred embodiment with one shear-sensitive piezoelectric element, it responds to only one shear component and not to two components. The invention provides one part of the transducer elements of the dynamometer sensitive to shear in one direction, and the other part to shear in the direction normal thereto. The two directions span a plane XY at right angles to the normal direction of the force introduction plates (Z axes). In this direction, the transducer elements are sensitive to pressure.

The invention enables a dynamometer to be made considerably flatter than conventional ones, because each transducer element consists of only two piezoelectric elements and a carrier plate between them. Since the force may be introduced equally through the transducer elements described as through additional substitute elements, while both these and the transducer elements are of hard material, a mechanically very rigid measuring platform results, which can be fitted directly between machine parts and which has a very high natural frequency. It is therefore eminently suited for dynamic measurements during metal-cutting operations, especially where very rapid changes of force and torque components may occur.

BRIEF DESCRIPTION OF THE DRAWINGS

These and other objects, features and advantages of the present invention will become more apparent from the following description when taken in connection with the accompanying drawing, which shows, for purposes of illustration only, several embodiments in accordance with the present invention, and wherein:

FIG. 11 is a top plan view on a measuring platform without force introduction plate, provided with transducer elements sensitive to shear in different directions X, Y (all of them additionally sensitive to pressure in the z direction), and the measuring signals led out by means of an insulating film having printed wiring conductors X', Y', Z';

FIG. 12 is a cross-sectional view through the dynamometer in FIG. 8 without force introduction plates and taken along line A-A' of FIG. 11;

FIG. 13 is an analogous cross-sectional view but taken along line B-B' of FIG. 11:

DETAILED DESCRIPTION OF THE DRAWINGS

Figure 1:
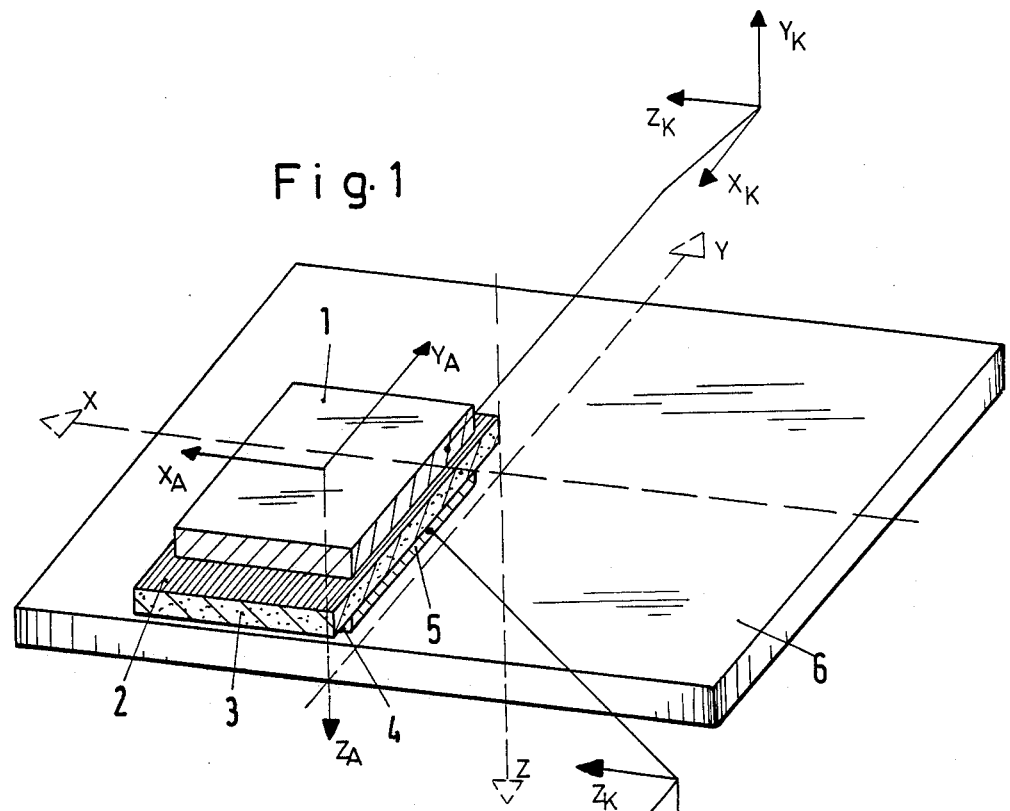
FIG. 1 is a perspective view of the orientation principle of a rectangular transducer element with the axes $X_A$, $Y_A$, $Z_A$ in relation to the coordinate system of the force introduction plates X, Y, Z (only the lower force introduction plate is shown), and the crystallographic pre-orientation principle of the piezoelectric elements $X_K$, $Y_K$, $Z_K$ in relation to the carrier plate.

Referring now to the drawing wherein like reference numerals are used throughout the various views to designate like parts, and more particularly to FIG. 1, this figure shows a view on a force introduction plate 6, fitted with a typical unhoused transducer element consisting of two piezoelectric elements 1, 5 and a carrier plate 3 between them. X, Y, Z denote the geometric coordinate system of the force introduction system, whereby Z is normal to the force introduction plates, X is normal to Z and Y is normal to both. In the case of a rectangular force introduction plate 6, X is placed parallel to a pair of edges, making Y parallel with the other pair.

The coordinate system $X_A$, $Y_A$, $Z_A$ of the transducer element shown is given by the edges of the carrier plate ($X_A$, $Y_A$) 3 and its normal ($Z_A$), presupposing, of course, a prior crystallographic pre-orientation of the elements 1, 5 in relation to the edges of carrier plate 3, and crystallographically properly ground surfaces and edges on the piezoelectric elements This crystallographic pre-orientation is explained in detail below.

The shear-sensitive piezoelectric element 1 is ground so that its longitudinal edges are exactly parallel with the crystallographic X and Z axes (here noted with $X_K$ and $Z_K$), while the crystallographic Y axis (here denoted $Y_K$) is normal to the largest surface of the piezoelectric element 1. The piezoelectric elements 1, 5 and the carrier plate 3 are aligned parallel to the crystal edges, using a stop device If the edges of the carrier plate 3 shown rectangular are at right angles with equal accuracy, the orientation of the element may be fixed purely mechanically by positioning the edges of the piezoelectric elements and carrier plates parallel on the carrier plate, whereby for subsequent direction wise orientation of the entire transducer element in relation to the geometric coordinate system of the force introduction plates a mark (not shown in the drawing) can be made, for example, at the lateral emergence point of the positive crystallographic Z direction ($Z_K$) from the shear element.

Analogously, the pressure element 5 is cut crystallographically, this time with the crystallographic Y and Z directions (denoted $Y_K$ and $Z_K$) parallel to the longitudinal edges of the piezoelectric element. The oriented fixing of the carrier plate 3 is effected on the other side, in the same operation if appropriate. The necessary machining of the element is indicated herein by the simplified description of "grinding". Of course, lapping and polishing operations may also be needed to attain the requisite accuracy.

FIG. 1 shows still more details of the preferred embodiment of the transducer element described above. The carrier plate 3 consisting of insulating material has an electrically conductive layer 2, 4 on both sides for leading away the measuring signals, about which more will be said below.

The drawing shows how the pre-oriented transducer element with the coordinate system $X_A$, $Y_A$, $Z_A$, already described, is oriented as a whole in relation to the coordinate system X, Y, Z of the force introduction system, which in the case of rectangular transducer elements and rectangular force introduction plates is effected by placing the corresponding edges parallel.

The typical transducer element consists of a piezoelectric element 1 sensitive to shear in one direction and a pressure-sensitive piezoelectric element 5 normal to the force introduction plates, i.e. two piezoelectric elements instead of the usual six.

Figure 2:
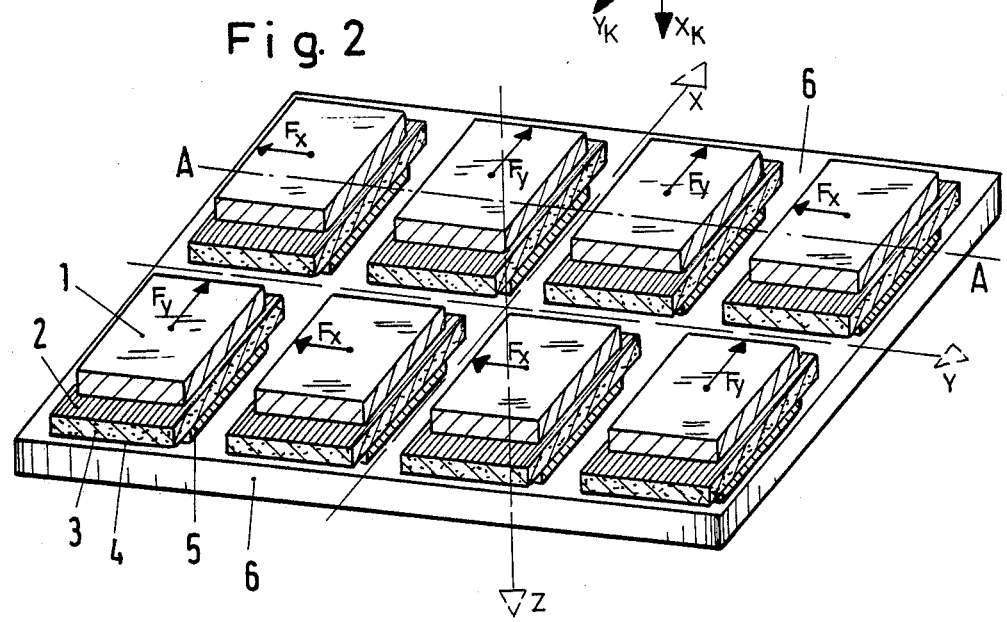
FIG. 2 is a plan view of a dynamometer with several rectangular transducer elements oriented in different directions in accordance with one embodiment of the invention.

FIG. 2 shows a view on a force introduction plate 6 fitted with several crystallographically pre-oriented, rectangular transducer elements without housing, according to FIG. 1. The orientation of the individual elements in relation to the coordinate system X, Y, Z of the force introduction plate 6 is effected as a whole at the installation, as described above. Each element is sensitive to pressure in the Z direction (cf. reference symbol $F_Z$ in FIG. 3) and to shear in the X or Y direction, represented by the shear forces $F_X$ and $F_Y$, but not in both directions at the same time, as with conventional dynamometers. Because the same measuring capabilities result as when all individual elements are sensitive to shear in both the X and Y directions, it is possible to reduce the number of piezoelectric elements without restricting the application possibilities. The dynamometer fully fitted with rectangular transducer elements shown in FIG. 2 represents an embodiment with high measuring sensitivity and wide measuring range. Its other advantages will be described below.

Figure 3:
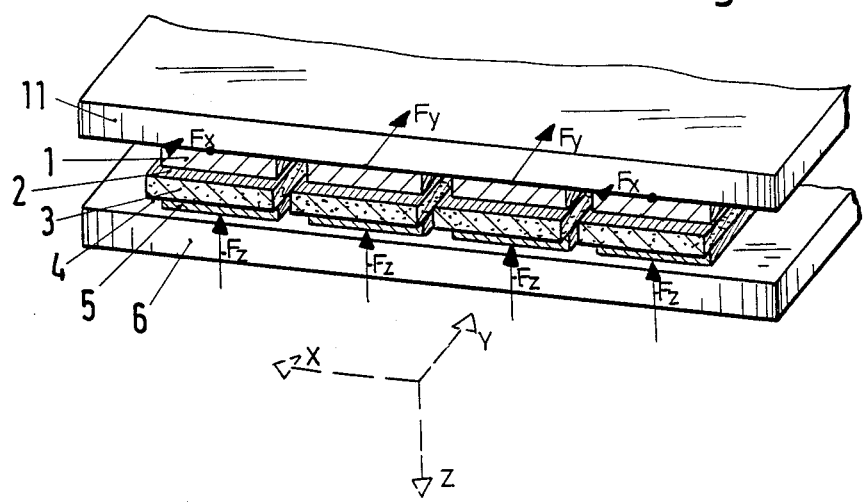
FIG. 3 is a perspective view from the side of the dynamometer according to FIG. 2.

To make things clear, FIG. 3 shows a perspective cross section through the measuring platform, revealing both force introduction plates 6, 11. Characteristic of the dynamometer is that the transducer elements are sensitive to pressure, but that each one is sensitive to shear in one direction only, some being shear-sensitive in the X direction, others in the Y direction. The force sensitivity directions are represented in the drawings by the force components $F_x$, $F_y$, $F_z$. By abandoning the requirement that each transducer must be sensitive to shear in two directions, fewer piezoelectric elements are needed (two instead of the usual six), saving expensive materials but also work costs, for example, in the manufacturing processes involved (cutting, lapping and polishing the elements), testing and orienting in relation to the coordinate system X, Y, Z of the force introduction plates. As mentioned previously, by using lower transducer elements without housings the dynamometer can be made flatter and hence less yielding, especially with the preferred use of transducer elements having rectangular elements and carrier plates, which can be joined close together Due to their rigid material, the dynamometer is stiffened, attaining very high natural frequencies for the reasons stated. Moreover, the possibility of arraying a large number of transducer elements makes possible a high measuring sensitivity and a high load limit. Even though each individual transducer element is no longer sensitive to all three force components (in the X, Y and Z directions) as before, but instead only the elements in their entirety, for the applications considered herein, especially metal-cutting operations, configurations and electrical circuitries are usually feasible which enable these measurands to be detected as with three-component measuring cells. The different sensitivity directions of the piezoelectric elements enable all three force components to be measured and the torques and force application point to be calculated.

Figure 4:
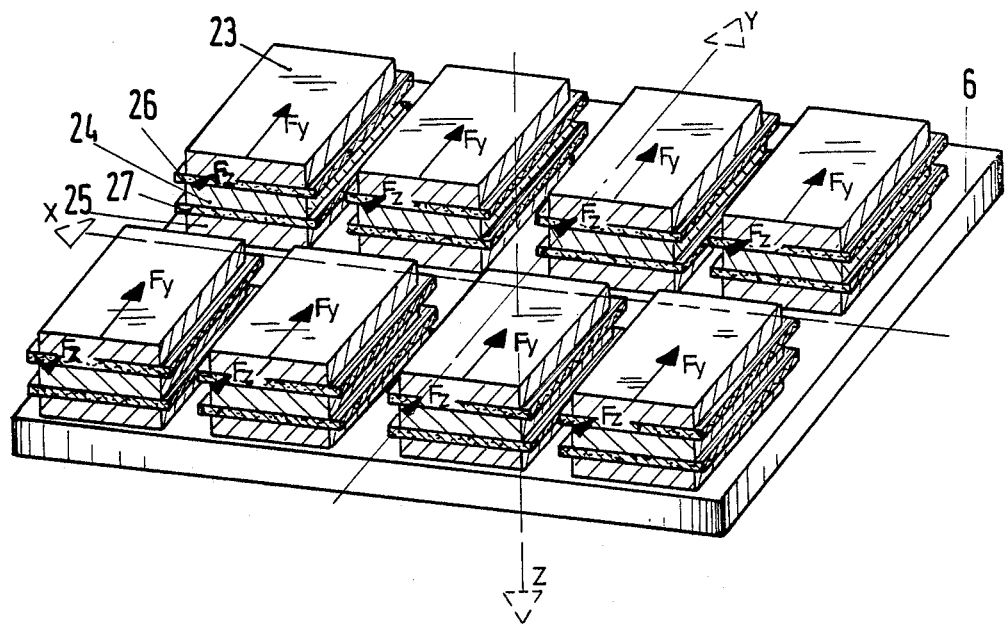
FIG. 4 is a perspective view from above of a dynamometer fitted with crystallographically pre-oriented transducer elements, consisting of two piezoelectric elements sensitive to shear in different axes, one pressure-sensitive piezoelectric element and two carrier plates between them, without upper force introduction plate, in accordance with another embodiment of the invention.

FIG. 4 shows a force introduction plate 6 fitted with another embodiment of the transducer element. This consists of two shear-sensitive piezoelectric elements 23, 25, one of them sensitive to shear in the Y direction, the other in the X direction, a piezoelectric element 24 sensitive to pressure in the Z direction, and two carrier plates 26, 27 between them. The shear sensitivities are indicated in the figure by the corresponding forces $F_x$, $F_y$. The pressure force acting on the pressure-sensitive piezoelectric crystal 24 along the Z axis is not shown.

Characteristic of this transducer element also is the absence of a housing, and the crystallographic pre-orientation of the piezoelectric elements 23, 24, 25 in relation to the carrier plates 26, 27. This is effected in the same manner as described in connection with FIG. 1. Here again, the crystallographic pre-orientation entails savings in material and work costs. The embodiment of the transducer element described above finds use primarily in dynamometers with small lateral dimensions, because here there is insufficient space for separating the transducer elements into those sensitive to shear only in the X direction and those only in the Y direction. The dynamometer must be under a preload sufficient to enable measurement of the maximum tensile forces sustained.

Figure 5:
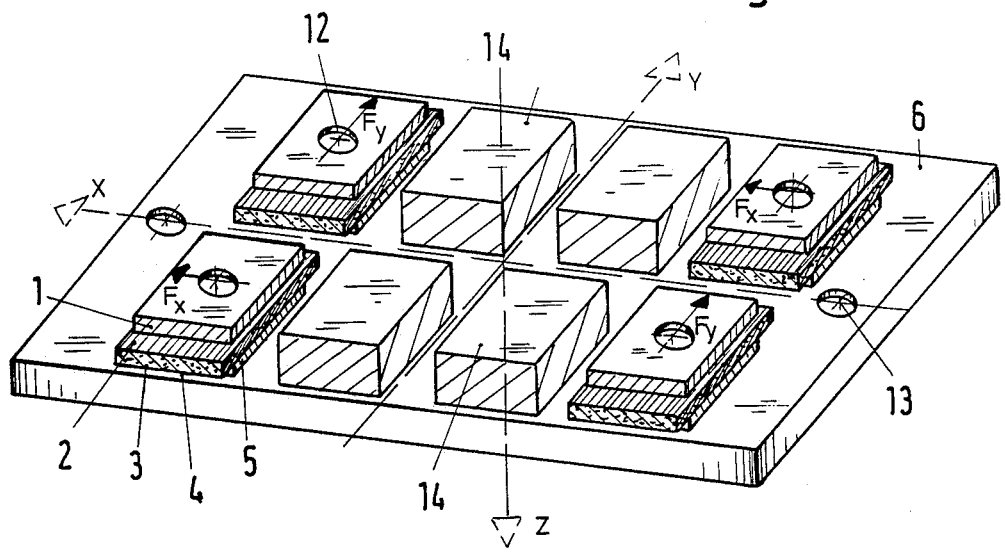
FIG. 5 is a perspective view from above of a dynamometer with rectangular transducer and substitute elements, with individual elements having a hole to take a preloading screw (the force introduction plates having also a hole through them), without upper force introduction plate, in accordance with a third embodiment of the invention.

In the embodiment shown in FIG. 5, individual transducer elements are provided with a central hole 12, through which a preloading screw is fitted, passing through the force introduction plates as well and clamping the piezoelectric elements together. In this way a very uniform stress distribution is obtained on the transducer element, rotationally symmetric to the element axis. This ensures that cross-talk effects are negligibly small. The holes 13 on the lateral edges of the force introduction plates serve to keep the outer parts of the measuring platform under preload. Besides showing transducer elements, FIG. 5 also shows substitute elements 14. These serve to provide a definable force division, facilitating adaptation of the measuring platform to the requirements of different applications. Thus depending on the amount of force division, a very wide range of forces may be measured with the same type of transducer element. The substitute elements 14 may be distributed also so that the force division differs locally. The substitute elements 14 have similar properties with regard to elasticity and coefficient of expansion, and are therefore made advantageously of the same material as the transducer elements. Both may have central holes to take preloading screws.

Figure 6:
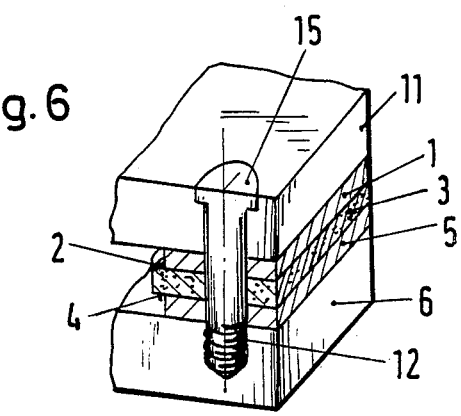
FIG. 6 is a perspective sectional view of an element with preloading screw of the dynamometer according to FIG. 5.

FIG. 6 shows in cross section a single transducer element preloaded with a preloading screw 15. As before, 6, 11 denote the force introduction plates, 1 to 5 the transducer element, 12 the central hole and 15 the preloading screw.

Figure 7:
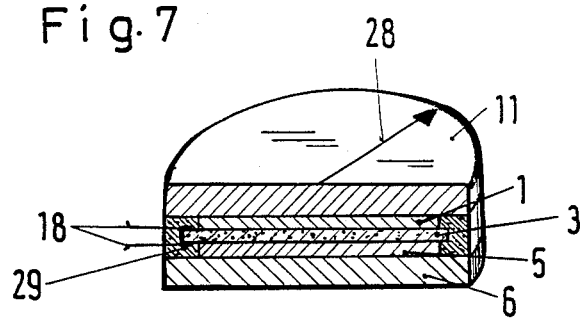
FIG. 7 shows a dynamometer consisting of a transducer element and force introduction plates joined rigidly to it, according to a fourth embodiment of the invention.

FIG. 7 shows a dynamometer consisting of only one transducer element and force introduction plates rigidly joined thereto.

Figure 15:
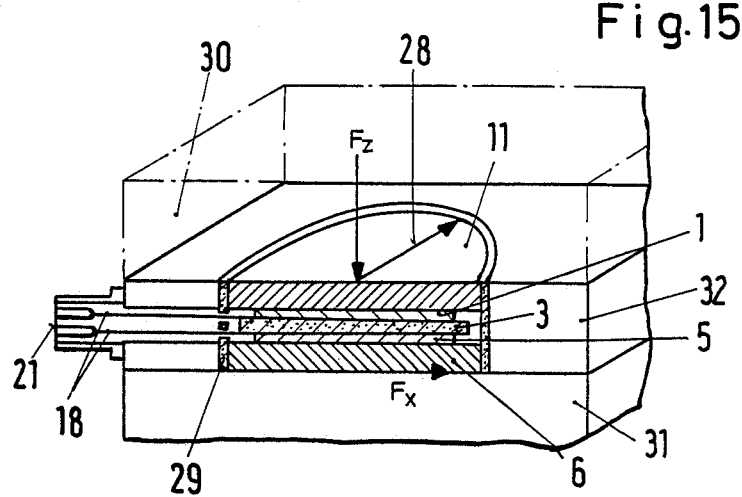
FIG. 15 is a perspective view of a dynamometer consisting of a transducer element and two force introduction plates in a milled recess on a machine component.

Often, several transducer elements are sandwiched between common upper and lower force introduction plates, and are oriented during assembly in relation to the coordinate system X, Y, Z of the force introduction plates. Most figures shown herein are based on applications of this kind. The shear-sensitive piezoelectric element may be given a marking line 28, indicating the direction of shear sensitivity as an orientation aid. Sandwiching the transducers between the force introduction plates is performed at the manufacturer. The customer usually fits finished measuring platforms. In other cases it may be desirable to fit individual transducer elements between the force introduction plates instead of complete measuring platforms. The arrangement of the elements can then be made very application-specific, and may be performed by the customer too. (An application of this kind is shown in FIG. 15). This presupposes that the force is introduced into the individual elements, which means in turn that each of these individual elements carries a force introduction plate on each side. The upper force introduction is denoted with 11 and the lower one with 6. Also shown is the marking line 28, indicating the direction of sensitivity to shear. It is advantageous to seal the element with an encapsulation compound 29. The connecting points soldered onto the top and bottom sides of the carrier plate are denoted in FIG. 15 with 18.

Figure 8:
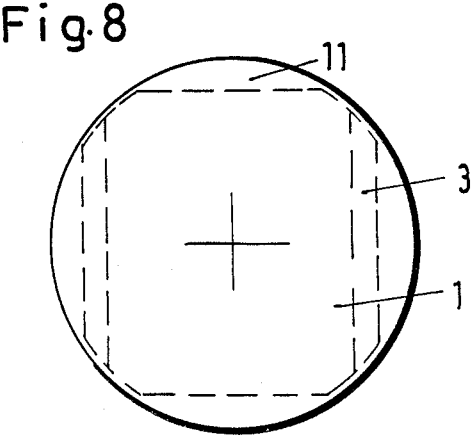
FIG. 8 is a plan view on the dynamometer in FIG. 7.

FIG. 8 shows in projection the transducer element just described. The broken lines indicate the upper piezoelectric element 1 and the carrier plate 3, both in a preferred embodiment, i.e. as rectangular plates rounded at the corners.

Figure 9:
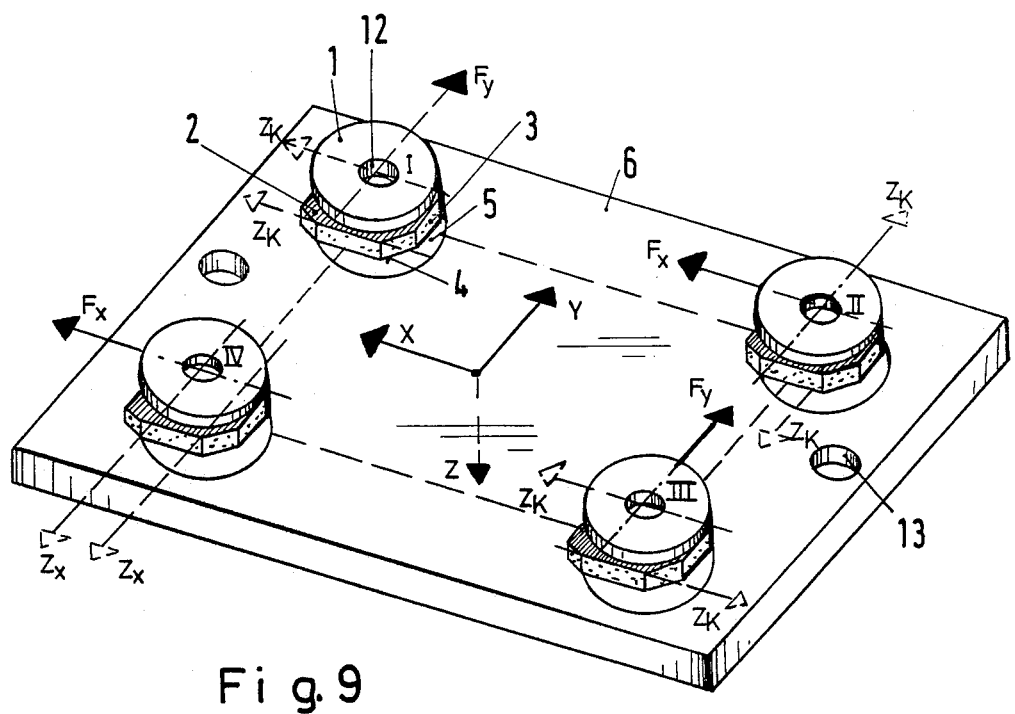
FIG. 9 is a perspective view of a dynamometer without upper force introduction plate, having four transducer elements arranged in a rectangle, with one annular, piezoelectric element sensitive to pressure in the Z direction, and two piezoelectric elements sensitive to shear in the X and Y directions, respectively, in accordance with a fifth embodiment of the invention.

FIG. 9 shows in perspective a dynamometer with four transducer elements arranged in a rectangle symmetrical with the axis cross of the force introduction system X, Y, Z, without the upper force introduction plate. This arrangement in principle has been shown previously in DE-PS No. 19 52 522 mentioned at the outset. Six-component measurement can be Performed with it (three force components $F_X$, $F_Y$, $F_Z$ and three torque components $M_X$, $M_Y$, $M_Z$), though fewer components may be measured also. In the application as cutting force dynamometer, for example, only the force components $F_X$, $F_Y$, $F_Z$ may be wanted, with their application point in this case lying outside the rectangle formed by the transducer element. In the configuration shown, one pair of transducer elements diagonally opposite measures the force components in the X direction, $F_X$, the other two measure the force components in the Y direction, $F_Y$, while all four measure the compressive forces $F_Z$.

In the configuration shown, each transducer element comprises only two piezoelectric elements 1, 5 (one sensitive to shear, the other to pressure), whereas the measuring cells employed hitherto have six piezoelectric elements. The measuring arrangement with four transducer elements as described above thus allows a reduction from 24 piezoelectric elements to 8, saving expensive material, manufacturing work, orientation and testing as already mentioned. The configuration shown employs only two types of transducer elements, i.e., with the crystallographic Z axes ($Z_K$) parallel (element I, IV) and with them antiparallel (element II, III). In addition to the reduced number of piezoelectric elements and the cost economies associated therewith, the configuration shown using the new transducer elements according to FIG. 4 allows the assembly of thinner, stiffer measuring platforms with higher natural frequencies.

According to the invention, circular piezoelectric elements 1, 5 may be used as transducer elements, as shown in FIG. 7. This configuration is advisable where the dynamometer is to have only few elements, i.e., when sufficient space is available. An advantage of circular piezoelectric elements is that the preload reduces the danger of cross-talk.

Arranging the four transducer elements with two diagonally opposite measuring in the X shear direction and the other two measuring in the Y shear direction also reduces cross-talk.

The four transducer elements shown in FIG. 9 lie between two force introduction plates. However, provision is made according to the invention also for force introduction via force introduction plates joined rigidly to each individual transducer element. An element of this kind is shown in FIGS. 7 and 8. The dynamometer in the form of a measuring platform as shown in FIG. 9 is supplied by the manufacturer as a finished component for installation. The advantage of employing transducer elements according to FIGS. 7 and 8 is that the choice of configuration, e.g the size of the rectangle mentioned above, is more free. The positioning and typically the sandwiching between two machine parts can be effected by the customer himself, and the dimensions may be adapted to machines of different sizes. Naturally, a great variety of transducer element configurations are possible, depending on the application requirements. It is possible also to place transducer elements according to FIGS. 7 and 8 not between two machine parts but in a recess milled-out from a machine part. Details on this are given in the description to FIG. 15. To fix the individual elements in a given arrangement, it may be advantageous, for example, to provide the milled recesses in a machine part with matching recesses and contact surfaces, in which the transducer elements are placed and fixed in the orientation required by the application, employing, for example, cements.

Figure 10:
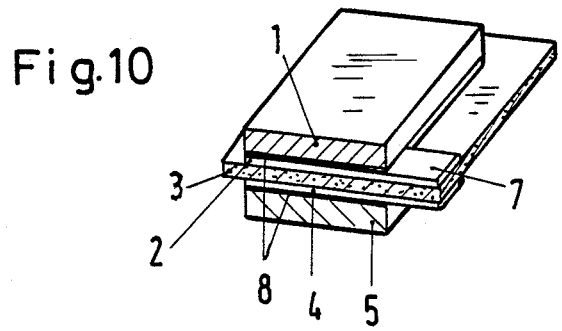
FIG. 10 is a perspective view of a single transducer element with electrical contact surfaces.

FIG. 10 shows an embodiment of the invention with electrical connections 7 for leading-out the measuring signals and for the electrical contact between the electrically conductive layers 2, 4 on the carrier plate 3 and the piezoelectric elements 1, 5. In general, the element surfaces adjoining the force introduction plates are set at ground potential. When a force acts on the element surfaces adjoining the electrically insulating carrier plate, charges are then set up which must be led-out to the measuring electronics. This entails firstly electrically conductive layers on both sides of the carrier plate, throughout or as printed wire conductors, secondly fixing the piezoelectric elements on the carrier plate, which is a good electrical conductor. This fixing is accomplished advantageously with an electrically conductive adhesive, applied in a thin coating 8 between the piezoelectric element and the electrically conductive layers 2, 4 of the carrier plate 3.

For a transducer element according to FIGS. 6 to 8, only two electrical connections are needed, whereas conventional two-component transducers need additionally two signal electrodes and at least one internally connected ground electrode.

With the transducer elements according to the invention therefore, electrical and mechanical components can be saved as well as work.

The electrical connections between the transducer elements and connecting elements such as cables, plugs or circuit boards may be produced typically by soldering wires or metal strips to the contact surfaces 7 of the carrier plate 3.

FIG. 11 shows a modern embodiment of the signal lead-out. It shows a plan view on the lower force introduction plate 6, on which eight transducer elements are mounted, sensitive to shear in the X and Y directions, respectively, and to pressure in the Z direction. The signals from the individual element are led out via the contact surfaces shown in FIG. 10. The film 16 shown in plan view in FIG. 11 consists of a metallized plastic film on which the metal has been etched away, leaving the U-shaped conductors X', Y', Z' shown, which lead to the soldering eyelet 17 on the right-hand side of the drawing, from which the signals to be summed for $F_X$, $F_Y$, $F_Z$ may be led off typically via wires 18 soldered-in. The electrical connection between the electrically conductive layers of the transducer elements and the corresponding conductors X', Y', Z' of the film can be effected by soldering to the connecting surfaces 7, which are formed by a part of the electrically conductive coatings 2, 4 of the carrier plates 3 projecting beyond the surface of the piezoelectric elements 1, 5. By means of a suitable U-shaped layout of the conductors 17, it is possible to lead the shear signals originating from X shear forces to conductor X', those from Y shear forces to conductor Y', with conductors X' and Y' carefully insulated from each other. The pressure signals are led out via a straight conductor Z', which is connected with the connecting surfaces (7) adjoining the pressure-sensitive piezoelectric elements.

The contact and insulation conditions are made clear in FIGS. 12 and 13 by two cross sections A-A' and B-B' of FIG. 11. The film is carried mechanically by eight contact points if the contacts via wires are not counted.

Figure 14:
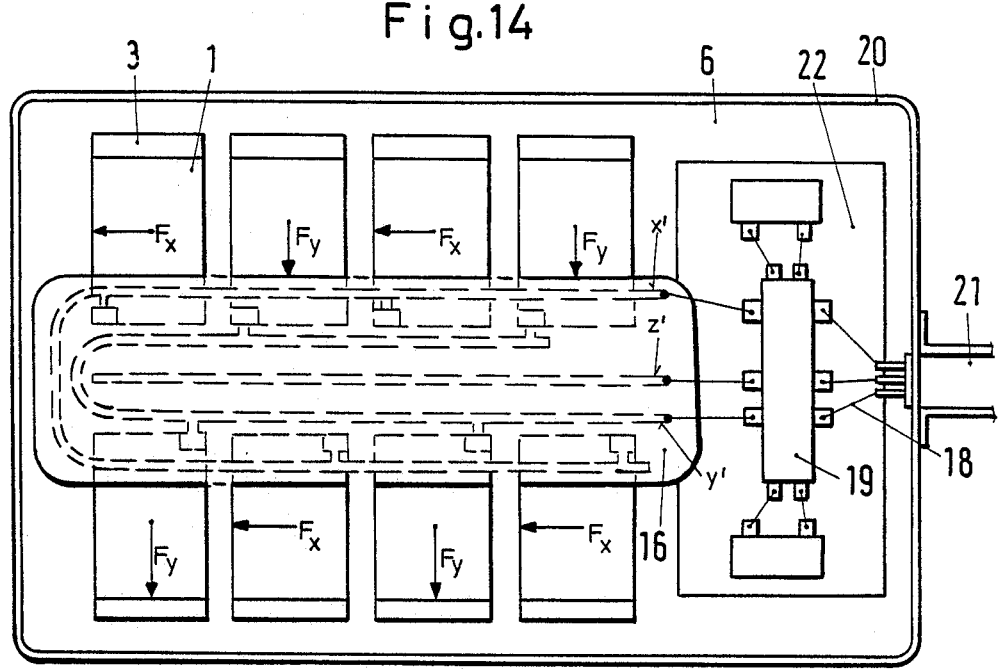
FIG. 14 is a top plan view, without upper force introduction plate, on a dynamometer with integrated measuring electronics.

FIG. 14 shows a view onto a force introduction plate 6 fitted with transducer elements, with signals led off via the conductor X', Y', Z' of a film 16. The measuring electronics and the evaluation logic, typically with analog-digital converters, operational amplifiers and programmed storages, may be accommodated on the film 16 or on a mounting plate 22 and thus integrated into the dynamometer. This integration offers advantages especially in applications where miniaturization and low susceptibility to interfering signals are important, such as those of electromagnetic nature. This is the case, for example, in a machine room. Furthermore, the output signals are already calibrated, so that no calibration is necessary by the user and the interchangeability of the electronic measuring part is improved. Also shown is the housing 20 with a connector 21 fixed thereto.

FIG. 15 shows a typical embodiment of the transducer element shown already in FIGS. 7 and 8, which is rigidly connected with the force introduction plates.

For measuring a significant force part in one or more components, the transducer element is placed into a milled recess in a machine part, with an additional distance or spacer plate 32 as required, which can be dimensioned in height so that the desired preload is obtained in the transducer element when machine parts 30 and 31 are pressed together, and also so that the force component sustained by the transducer element may be determined. By selecting a suitable material with appropriate modulus of elasticity and adopting a certain height difference (not shown in FIG. 15) between the distance plate and transducer element and with a correct choice of cross sections for the latter and the distance plate, the preload and the force component bypassed can be adjusted, and with them the measuring range and measuring sensitivity. Also shown in FIG. 15 are the electrical lead-outs 18 arranged preferably in a milled-out recess within the distance plate 32, the connector 21 and an encapsulating compound 29 which may be injected to fill out wholly or in part the space between the force introduction plates 6, 11 of the transducer element 1, 3, 5, 6, 11 and into the annual gap between this transducer element and the distance plate 32, for sealing and fixing purposes. Before placing the transducer element into the recess in the appropriate azimuthal position for measuring the shear forces, it may be advantageous to place it into a recess in the distance plate 32 suitable for accommodating the transducer element, then cementing the lower force introduction plate 6 rigidly to the distance plate 32, after which the transducer element together with the distance plate is placed into the milled-out recess in the machine part as a permanently joined unit. It is also possible, for simplifying the electrical lead-outs 18, to join only part of distance plate 32 to the transducer element as a permanently connected unit, which is inserted as a unit into the recess of the machine part, while the remaining part is inserted only afterwards. Instead of a milled-out recess in the machine part, the transducer element may also be positioned between two plane machine parts.

As already explained, with the standard transducer element, one pressure and one shear force can be determined, here denoted with $F_Z$ and $F_X$. The orientation of the element in relation to the coordinate system of the machine parts may be effected by means of a marking line 28 on a force introduction plate 11. For certain applications, transducer elements are efficacious which are capable of measuring two shear components $F_X$ and $F_Y$ in addition to the pressure components. This can be obtained according to the invention with a transducer element assembled from two transducer elements rotated 90° in the plane surface of the force introduction plate, or preferably (cf. FIG. 4) with a transducer element consisting of a pressure-sensitive piezoelectric element 25 and two shear-sensitive piezoelectric elements 23, 24 whose sensitivity directions lie normal to each other in the plane of the plate.

The embodiments of the multi-component dynamometer shown according to the invention, for measuring forces and torques, demonstrate that the manufacture of dynamometers can be made much more rational using crystallographically pre-oriented transducer elements, because savings are possible in material and work costs. In particular, the transducer element consisting of two piezoelectric elements and a carrier plate between them allows the number of piezoelectric elements to be reduced, but also the electrical connections and element types as well. Moreover, dynamometers designed in this way are flat and therefore easy to install, yet rigid, so that very high natural frequencies can be attained. This makes them very suitable for dynamic measurements with very rapid changes of force, as occur during metal-cutting operations, for example.

A special benefit is the omission of the housing previously needed for each individual transducer element, enabling the transducer elements to be fitted into the force introduction plates of the dynamometer with minimal space requirement. The embodiment of the dynamometer with only one type of transducer element, which is joined permanently to the force introduction plates, is distinguished by universal adaptability to the requirements of the various applications. Configuration and installation geometry may be varied within wide limits by the user.

The piezoelectric elements consist preferentially of crystalline piezoelectric materials, but the invention is not restricted thereto. On the contrary, it covers all other piezoelectric materials, such as non-crystalline piezoelectric ceramics, with pronounced force sensitivity directions, which can be oriented analogously to the embodiments described.

While we have shown and described several embodiments in accordance with the present invention, it is understood that the present invention is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A multi-component dynamometer for measuring forces and torques, especially in metal-cutting operations, comprising at least one piezoelectric transducer element arranged between a pair of force introduction plates, the transducer element including at least two piezoelectric elements each having a predetermined crystallographical orientation and a flat alignment edge parallel to a crystal axis, and said two piezoelectric elements being joined to an insulating carrier plate therebetween with their flat alignment edge parallel with an alignment edge of said carrier plate whereby the piezoelectric elements are pre-oriented crystallographically in relation to a coordinate system provided by the carrier plate, and the carrier plate is oriented in relation to a coordinate system of said force introducing plates, a first piezoelectric element being sensitive to pressure in a direction essentially normal to a plane of the force introduction plates and a second piezoelectric element being sensitive to shear essentially in the plane of the force introduction plates.

2. A dynamometer according to claim 1, which comprises at least two piezoelectric transducer elements, of which the second piezoelectric element of a first transducer element responds to shear forces in a direction essentially parallel to one edge of the force introduction plates and the second piezoelectric element of a second transducer element responds to shear forces in a direction plates.

3. A dynamometer according to claim 1, wherein the crystallographically pre-oriented transducer element as a whole is oriented in relation to a coordinate system given by a normal to the force introduction plates and the edges of the force introduction plates.

4. A dynamometer according to claim 1, wherein a respective transducer element consists of a carrier plate and no more than two piezoelectric elements.

5. A dynamometer according to claim 1, wherein the carrier plate of the pre-oriented transducer element is rectangular.

6. A dynamometer according to claim 1, further comprising substitute elements between the force introduction plates in addition to the transducer element.

7. A dynamometer according to claim 6, wherein an individual transducer and/or substitute element is provided with a central hole.

8. A dynamometer according to claim 1, wherein the force introduction plates are clamped together by pre-loading screws led through central holes in the transducer element and/or in the plates.

9. A dynamometer according to claim 1, with two force introduction plates and a transducer element therebetween, and wherein the direction of shear sensitivity is marked on one of the force introduction plates.

10. A dynamometer according to claim 1, wherein the dynamometer is sealed against the surrounding parts and/or fixed in its position by an encapsulation compound.

11. A dynamometer according to claim 1, wherein the transducer element is joined to the force introduction plates devoid of any housing.

12. A piezoelectric transducer element according to claim 1, wherein said flat alignment edge is coplanar with said alignment edge of said carrier plate.

13. A piezoelectric transducer element according to claim 1, wherein said carrier plate is rectangular and extends laterally beyond said two piezoelectric elements on at least two sides to expose its coordinate system.

14. A multi-component dynamometers for measuring forces and torques, especially in metal-cutting operations, comprising at least one piezoelectric transducer element between a pair of force introduction plates, each transducer element having three or more piezoelectric elements separated from each other by insulating carrier plates therebetween, each piezoelectric element having a predetermined crystallographic orientation and a flat alignment edge parallel to a crystal axis, and said piezoelectric elements being rigidly joined to said carrier plates with their flat alignment edge parallel with an alignment edge of said carrier plates whereby the piezoelectric elements are pre-oriented crystallographically in relation to a coordinate system given by the carrier plates and the carrier plates are oriented in relation to a coordinate system of said force introduction plates so that at least one of the piezoelectric elements is sensitive to pressure in a direction essentially normal to the plane of the force introduction plates, and at least two other piezoelectric elements are sensitive to shear essentially in the plane of the force introduction plates in directions essentially normal to each other, whereby one of the shear-sensitive piezoelectric elements is oriented essentially parallel to one edge of the force introduction plates.

15. A dynamometer according to claim 14, wherein the piezoelectric elements are joined to conductive layers of the carrier plates and/or to the force introduction plates by an electrically conductive adhesive.

16. A dynamometer according to claim 14, further comprising an insulator plate or a film with electrical printed wiring conductors between a plurality of transducer elements, whereby signal transmission from the transducer elements to the printed wiring conductors takes places by way of connecting surfaces.

17. A dynamometer according to claim 16, wherein the outer ends of the printed wiring conductors are provided with soldering eyelets.

18. A dynamometer according to claim 14, in which four transducer elements are positioned at the corners of a rectangle with two sides parallel to the X direction of the force introduction system and two sides parallel to its Y direction and oriented in such a manner that they are sensitive to pressure normal to the force introduction plates and each pair of them is sensitive to shear in one of the directions parallel to the two pairs of the sides of the rectangle.

19. A dynamometer according to claim 14, wherein the crystallographically pre-oriented transducer elements as a whole are oriented in relation to the coordinate system given by a normal to the force introduction plates and the edges of the force introduction plates.

20. A multi-component dynamometer for measuring forces and torques, especially in metal-cutting operations, comprising at least two piezoelectric transducer elements arranged between a pair of force introduction plates, each transducer element including at least two piezoelectric elements joined to an insulating carrier plate therebetween, the piezoelectric elements being pre-oriented crystallographically in relation to a coordinate system provided by the carrier plate, one of the piezoelectric element being sensitive to pressure in a direction essentially normal to a plane of the force introduction plates and the other being sensitive to shear essentially in said plane of the force introduction plates, an insulator plate or a film with electrical printed wiring conductors between the transducer elements, whereby signal transmission from the transducer elements to the printed wiring conductors is by connecting surfaces.

21. A multi-component dynamometer for measuring forces and torques, especially in metal-cutting operations, comprising at least four piezoelectric transducer elements arranged between a pair of force introduction plates at the corners of a rectangle with two sides parallel to the X direction of the force introduction system and two sides parallel to its Y direction, each transducer element including at least two piezoelectric elements joined to an insulating carrier plate therebetween, the piezoelectric elements being pre-oriented crystallographically in relation to coordinate system provided by the carrier plate, one of the piezoelectric elements being sensitive to pressure in a direction essentially normal to a plane of. the force introduction plates and the other being sensitive to shear essentially in said plane of the force introduction plates, the four transducer elements being oriented in such a manner that they are sensitive to pressure normal to the force introduction plates and each pair of them is sensitive to shear in one of the directions parallel to the two pairs of the sides of the rectangle.

* * * * *

UNITED STATES PATENT AND TRADEMARK OFFICE
CERTIFICATE OF CORRECTION

PATENT NO. : 4,802,371

DATED : February 7, 1989

INVENTOR(S) : Reto Calderara et al.

It is certified that error appears in the above-identified patent and that said Letters Patent is hereby corrected as shown below:

Claim 2, line 8, after "tion", insert:

--essentially normal to said one edge of the force introduction--

Signed and Sealed this

Thirty-first Day of October, 1989

*Attest:*

DONALD J. QUIGG

*Attesting Officer*     *Commissioner of Patents and Trademarks*